(12) United States Patent
Barreneche et al.

(10) Patent No.: US 12,043,711 B2
(45) Date of Patent: Jul. 23, 2024

(54) LAMINATION FILM AND ADHESIVE THEREFOR

(71) Applicants: Dow Global Technologies LLC; Dow Quimica De Colombia S.A.; Rohm and Haas Company

(72) Inventors: Felipe Martinez Barreneche, Houston, TX (US); Elkin David Cardona Jimenez, Medellin (CO); Juan Carlos Casarrubias, Mexico City (MX); Jie Wu, Lake Jackson, TX (US)

(73) Assignees: Dow Global Technologies LLC, Midland, MI (US); Dow Quimica De Colombia S.A., Bogota (CO); Rohm and Haas Company, Collegeville, PA (US)

( * ) Notice: Subject to any disclaimer, the term of this patent is extended or adjusted under 35 U.S.C. 154(b) by 180 days.

(21) Appl. No.: 17/311,317

(22) PCT Filed: Oct. 25, 2019

(86) PCT No.: PCT/US2019/058093
§ 371 (c)(1),
(2) Date: Jun. 4, 2021

(87) PCT Pub. No.: WO2020/117398
PCT Pub. Date: Jun. 11, 2020

(65) Prior Publication Data
US 2022/0017705 A1  Jan. 20, 2022

Related U.S. Application Data

(60) Provisional application No. 62/774,986, filed on Dec. 4, 2018.

(51) Int. Cl.
*C08J 5/12* (2006.01)
*B32B 1/00* (2024.01)
(Continued)

(52) U.S. Cl.
CPC .............. *C08J 5/124* (2013.01); *B32B 1/00* (2013.01); *B32B 7/12* (2013.01); *B32B 27/08* (2013.01);
(Continued)

(58) Field of Classification Search
CPC .............. B32B 1/00; B32B 2307/50; B32B 2439/40; B32B 2439/46; B32B 27/08;
(Continued)

(56) References Cited

U.S. PATENT DOCUMENTS

| 4,873,307 A | 10/1989 | Federici et al. |
| 4,889,915 A | 12/1989 | Brauer et al. |
| 10,272,650 B2 | 4/2019 | Gargalaka et al. |

FOREIGN PATENT DOCUMENTS

| WO | 2014036106 A1 | 3/2014 |
| WO | 2018013222 A1 | 1/2018 |

OTHER PUBLICATIONS

Dow Technical Informatin Engage 8407, published Apr. 2020.*
(Continued)

*Primary Examiner* — Yan Lan
(74) *Attorney, Agent, or Firm* — Boyle Fredrickson, S.C.

(57) ABSTRACT

A film structure including: (a) at least one functionalized film layer, wherein the at least one film layer comprises a polar-reactive group polyolefin layer used as an internal layer in the film structure; and (b) a lamination adhesive composition present on, and in contact with, a least a portion of a surface of the internal layer; wherein the green tack value of the adhesive composition is greater than 0.772 Newtons/centimeter; a laminate including the above film structure bonded to a substrate layer; a process for producing the film structure; a process for producing the laminate; and a laminated article made from the above laminate.

8 Claims, 1 Drawing Sheet

(51) Int. Cl.
*B32B 7/12* (2006.01)
*B32B 27/08* (2006.01)
*B32B 27/16* (2006.01)
*B32B 27/30* (2006.01)
*B32B 27/32* (2006.01)
*B32B 27/36* (2006.01)
*B65D 65/40* (2006.01)
*C08J 5/18* (2006.01)
*C09J 5/00* (2006.01)
*C09J 175/04* (2006.01)

(52) U.S. Cl.
CPC ............ *B32B 27/16* (2013.01); *B32B 27/306* (2013.01); *B32B 27/327* (2013.01); *B32B 27/36* (2013.01); *B65D 65/40* (2013.01); *C08J 5/18* (2013.01); *C09J 5/00* (2013.01); *C09J 175/04* (2013.01); *B32B 2439/46* (2013.01); *C08J 2323/26* (2013.01); *C08J 2367/02* (2013.01); *C08J 2475/04* (2013.01); *C09J 2423/008* (2013.01); *C09J 2467/008* (2013.01); *C09J 2475/00* (2013.01)

(58) Field of Classification Search
CPC ....... B32B 27/16; B32B 27/30; B32B 27/306; B32B 27/32; B32B 27/327; B32B 27/34; B32B 27/36; B32B 7/12; C08J 2323/26; C08J 2367/02; C08J 2475/04; C08J 5/124; C08J 5/18; C09J 175/04; C09J 2423/008; C09J 2467/008; C09J 2475/00; C09J 5/00; B65D 65/40
See application file for complete search history.

(56) References Cited

OTHER PUBLICATIONS

PCT/US2019/058093, International Search Report and Written Opinion with a mailing date of Jan. 31, 2020.
PCT/US2019/058093, International Preliminary Report on Patentability with a mailing date of Jun. 8, 2021.

* cited by examiner

LAMINATION FILM AND ADHESIVE THEREFOR

FIELD

The present invention relates to a laminate film and an adhesive composition used in a lamination process for producing the laminate film.

BACKGROUND

The flexible packaging industry continues to search for ways of increasing the productivity of lamination processes used in the industry to attend to the market in the fastest possible way. The lamination industry regularly uses solvent-based products in an attempt to provide a fast lamination process for some of the most challenging structures such as polyethylene terephthalate (PET)/polyethylene (PE) and PET/aluminum (Al)/PE structures which are commonly used for chemically aggressive products. However, one of the limiting factors in the lamination process used in the flexible packaging industry is the curing time provided by lamination adhesives used in the lamination process. The curing time limits how fast a converter can process a film roll or web after a lamination step in the manufacturing process for producing a laminate. The curing time of a lamination adhesive affects how fast the bond strength of the adhesive increases to achieve the adhesive's maximum final bond strength value. Typically, a converter can produce the films used in the lamination process or purchase the films from a film manufacturer. Then the converter can print the film and laminate the film to a substrate to make the final laminate which can be delivered to a brand owner who can use the laminate in a packaging line to make a package article such as a pouch for packaging various products.

Some of the known adhesives used heretofore as lamination adhesives such as "high performance lamination adhesive systems", i.e., adhesive systems of polymeric compositions having a high solids content and a low molecular weight can also have a low "green tack" (e.g., a green tack of less than (<) 0.772 Newtons/centimeter [N/cm] or 200 grams-force/inch [g-f/in]) which is an undesirable characteristic in adhesives systems. The above high solids, low molecular weight adhesives having a low green tack can be easily processed and applied to film substrates; however, the adhesives can generate different processing problems. For example, a laminated film using the above adhesives can "telescope" (i.e., the layers of film may slide away from each other). An adhesive having low green tack can also cause delays in the overall package manufacturing process because the next packaging production step of the process has to wait for the laminated film to bond sufficiently to have sufficient integrity to be passed on to the next production step.

SUMMARY

The present invention can solve the process problems of the prior art by providing a combination structure of a functionalized film and a lamination adhesive having a high green tack property (e.g., greater than [>] 0.772 N/cm or 200 g-f/in) which can be laminated to a substrate to form a laminate product that can be used immediately in a manufacturing process for manufacturing a packaging article. Accordingly, the present invention provides a novel combination of (a) a proper monolayer or multilayer film structure and (b) a proper polymeric lamination adhesive composition of different functionalized polymers that has a high green tack value. The use of the above combination of components (a) and (b) in a lamination process, can minimize or eliminate the problems, such as telescoping, encountered in the lamination processes of the prior art. Advantageously, the use of the above combination of (a) a film structure and (b) a lamination adhesive composition in a lamination process enables a converter to carry out much faster subsequent conversion steps, after a lamination step, to convert a film structure to a laminate for producing a packaging film. This, in turn, enhances the productivity of an overall packaging film manufacturing process.

In accordance with the present invention, one embodiment is directed to a combination structure of a film and an adhesive including: (a) at least one functionalized film layer comprising a polar-reactive group polyolefin layer used as an internal layer in the film structure; and (b) a lamination adhesive composition present on, and in contact with, a least a portion of a surface of the internal layer; wherein the green tack value of the adhesive composition is >0.772 N/cm (200 g-f/in).

In another embodiment, the present invention is directed to a process for producing the above film/adhesive structure.

In still another embodiment, the present invention relates to a laminate including: (a) at least one functionalized film layer comprising a polar-reactive group polyolefin layer used as an internal layer in the film structure; (b) a lamination adhesive composition present on, and in contact with, at least a portion of a surface of the internal layer; wherein the green tack value of the adhesive composition is >0.772 N/cm (200 g-f/in); and (c) at least one polar or non-polar substrate; wherein at least a portion of a surface of the substrate is in contact with the adhesive composition.

In yet another embodiment, the present invention is directed to a process for producing the above laminate.

In even still another embodiment, the present invention is directed to a packaging article made using an adhesive having a strong bond and high green tack value of >0.772 N/cm (200 g-f/in).

DETAILED DESCRIPTION

Figure 1:
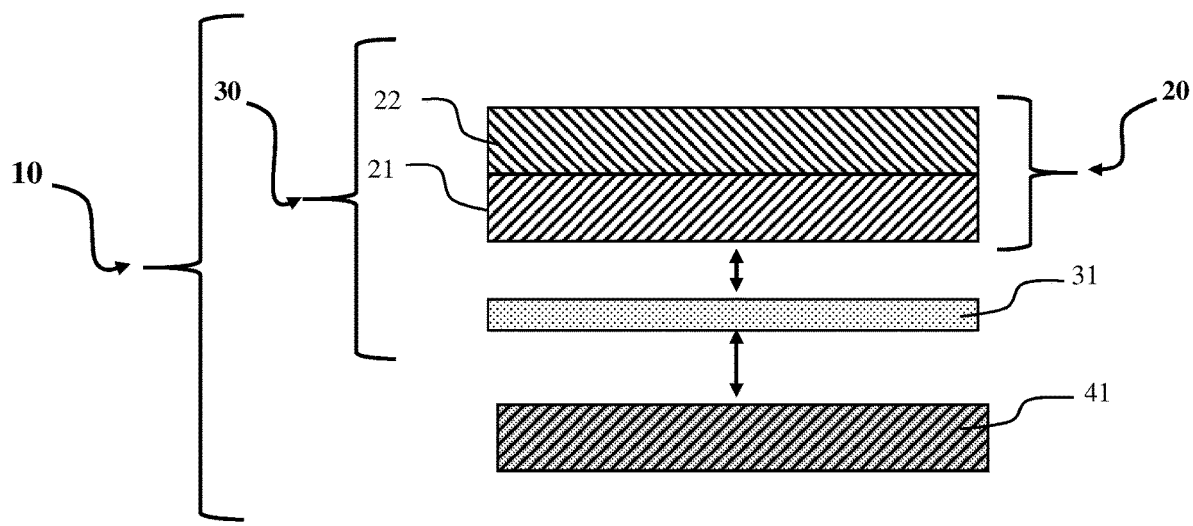
FIG. 1 is a schematic diagram showing a multilayer film structure of the present invention.

A "high performance lamination adhesive" herein refers to a two-component polyurethane adhesive that, once the adhesive is fully cured and properly applied between two substrate films, the adhesive develops a superior bond strength to avoid the possibility to separate the substrate films. Also, the adhesive is able to resist high thermal stress such as heat sealing (e.g., between 180° C. and 220° C.) and/or sterilization; and/or to resist attack by different aggressive chemical stuffs (e.g., acids, spicy, surfactants, essences, alcohol, peroxide). In comparison, a "medium performance adhesive", a "general performance adhesive", or "general purpose adhesive" will lose adherence in a two substrate films structure if the adhesive between the two films is subjected to the same conditions as the high performance lamination adhesive mentioned above.

"Green tack" or "green bond", with reference to an adhesive composition, herein means an initial bond strength value generated by the adhesive just after a structure containing the adhesive (e.g., a film/adhesive/film structure) passes through the NIP section of a laminating machine (the NIP is the small contact between two cylinders: one cylinder made of steel and the other cylinder made of rubber). In general, a higher molecular weight of the adhesive leads to a higher viscosity which, in turn, leads to a higher green bond.

"Bond strength", with reference to an adhesive composition, herein means the force that opposes delamination of a film laminated structure. The bond strength can be related to the adhesive composition. In a two-component adhesive, for example, selection of a correct stoichiometry of the adhesive composition can be important. For example, an adhesive that is rich in polyester will adhere stronger to polar films such as aluminum foil, metallized film, polyethylene terephthalate, polyamide, and the like. And, for example, an adhesive the is rich in polyether polyol will adhere stronger to non-polar substrates such as polyethylene, polypropylene, and the like.

By "predominantly isocyanate groups" or "predominantly hydroxyl groups", with reference to an adhesive composition, herein means the active or functional group present in an adhesive system. For example, isocyanate groups are the functional groups/reactive groups present in Part A of a two-component polyurethane adhesive; and Part B of the two-component polyurethane adhesive contains predominantly hydroxyl groups that will react with the isocyanate groups (of Part A) to form the adhesive. The chemical reaction starts after blending Part A and Part B together.

"Functionalized", with reference to a polymer resin, herein means when a functional (polar) group is chemically incorporated into another polar or non-polar polymer chain (e.g., polyethylene or ethylene copolymer) providing "additional chemical polar functionality".

One broad embodiment of the present invention includes a film structure of: (a) at least one functionalized film layer comprising a polar-reactive group polyolefin layer used as an internal layer in the film structure; and (b) a lamination adhesive composition present on, and in contact with, at least a portion of a surface of the internal layer; wherein the green tack value of the adhesive composition is >0.772 N/cm (200 g-f/in).

The film structure produced to be combined with a lamination adhesive composition can include a monolayer or a multilayer film structure. The multilayer lamination film structure is not limited to any particular number of layers; accordingly, in one preferred embodiment, the number of layers of the film structure can include from 1 layer to 13 layers made, for example, using a coextrusion process. For example, the film structure can include one or more layers of low density polyethylene (LDPE), linear low density polyethylene (LLDPE), or a blend of LDPE/LLDPE in any layer of the film structure provided that the internal layer of the film structure is a layer that contains the polar components.

The lamination adhesive composition, component (b), used in combination with the film structure, component (a), may include an admixture of: ($\alpha$) at least one isocyanate component; and ($\beta$) at least one polyol component. The isocyanate component ($\alpha$) of the lamination adhesive formulation or composition of the present invention includes at least one isocyanate compound; and the isocyanate is the predominant compound present in the adhesive composition, i.e., the concentration of the isocyanate component ($\alpha$) is greater than the concentration of the polyol component ($\beta$).

For example, the adhesive useful in the present invention contains a predominant content of isocyanate groups in component ($\alpha$), compared to the content of hydroxyl (OH) groups in component ($\beta$). Therefore, in accordance with the present invention, the concentration of the isocyanate compound, component ($\alpha$), used in the formulation of the present invention can be generally, for example, from 0.5 wt % to 10 wt % in one embodiment, from 1 wt % to 5 wt % in another embodiment; and from 2 wt % to 3 wt % in still another embodiment; based on the total weight of all components in the formulation.

Examples of adhesives that contain a predominantly isocyanate content and that are useful in the present invention include a high performance bi-component adhesive such as Adcote L 76-205/L87-124; and mixtures the above adhesive with other optional adhesives. Such adhesive advantageously quickly develops green bond.

The adhesive formulation of the present invention has advantageous properties and benefits. For example, in one embodiment, the adhesive of the present invention has an increase in green tack compared to other adhesive formulations that do not contain an isocyanate component that is the predominant component in the adhesive composition.

In general, the adhesive composition of the present invention includes a lamination adhesive composition that has a high green tack adhesion value of, for example, >0.772 N/cm (200 g-f/in) in one embodiment; >1,158 N/cm (300 g-f/in) in another embodiment; and >1.544 N/cm (400 g-f/in) in still another embodiment. In other embodiments, the green tack adhesion value of the adhesive composition can be in the range of, for example, from >0.772 N/cm (200 g-f/in) to 1.93 N/cm (500 g-f/in)

One benefit of the innovative design of the lamination film layer in contact with the adhesive composition of the present invention is that the adhesive composition has (1) a rapid development of green tack and (2) a faster bond strength development; based on the chemical interaction between the lamination layer and the adhesive layer after the lamination process. For example, when a predominantly isocyanate product is used to form an adhesive composition, the green bond (i.e., the green tack value) of the adhesive increases unexpectedly faster for the adhesive containing the predominantly isocyanate product than for an adhesive product without a functionalized resin. For example, an adhesive composition that has a higher content of functionalization (e.g., as described in Inv. Ex. 1 and Inv. Ex. 4 [Amplify g-MAh+MAh] herein below), the adhesive composition can have a higher green bond.

Another benefit of the present invention is the design of a lamination film with an OH functionality in the lamination layer promotes better instant adhesion and eliminate lag times of hours or days usually required to allow adhesion buildup after curing of the adhesive. By providing better instant adhesion and eliminating lag times, a significant reduction in the overall conversion process time can be achieved. Presently, laminators have to wait between 12 hours (hr) and 24 hr before the laminators can conduct a subsequent conversion step (e.g., a slitting step or a second lamination step) after application of the lamination adhesive. The long wait times of between 12 hr and 24 hr can be due, in particular, to the low green tack of the low-medium molecular weight (MW) adhesives used in the lamination process.

In general, the process for producing the film structure of the present invention includes the steps of:
 (i) providing (a) at least one functionalized film layer comprising a polar-reactive group polyolefin layer used as an internal layer in the film structure;
 (ii) providing (b) a lamination adhesive composition having a green tack value of >0.772 N/cm (200 g-f/in); and
 (iii) applying the lamination adhesive composition to a least a portion of a surface of the internal layer to form a combination of an internal layer and lamination adhesive composition film structure.

The process of making the film structure can include any of the layer making equipment and process known to those skilled in the art such as a coextrusion process and equipment.

In general, the laminate can include: (a) at least one film layer comprising a polar-reactive group (functionalized) polyolefin layer used as an internal layer in the film structure; (b) a lamination adhesive composition present on, and in contact with, at least a portion of a surface of the internal layer; wherein the green tack value of the adhesive composition is >0.772 N/cm (200 g-f/in); and (c) at least one polar or non-polar substrate; wherein at least a portion of a surface of the substrate is in contact with the adhesive composition.

With reference to FIG. 1, there is shown a plurality of layers forming a laminate, generally indicated by numeral 10. As aforementioned, the film structure, generally indicated as numeral 20 can be a monolayer, for example, layer 21 which can serve both as an internal layer and an external layer. In the embodiment shown in FIG. 1, the film structure 20 includes an internal layer 21 adhered to a separate and different external layer 22. Although not shown in FIG. 1, another embodiment of the present invention can include any multiple number of layers sandwiched inbetween the internal layer 21 and the external layer 22. As shown in FIG. 1, the adhesive layer 31 is applied to the internal surface 21; and a substrate 41 is contacted with the adhesive layer 31 to adhere the substrate to the film structure 20 via the adhesive 31 and internal layer 21. The layers 20, 31 and 41 can be compressed together to form the multilayer laminate 10.

The combination film/adhesive structure of the present invention has been described above. Once the adhesive is applied to the film layer, a substrate, component (c) can be contacted with the film/adhesive structure via the adhesive side.

The substrate useful in the present invention to produce the laminate can be, for example, at least one polar or non-polar substrate. Exemplary of polar substrates useful for contacting the film/adhesive combination described above can include polyethylene terephthalate (PET), bi-oriented poly amide (BOPA), metalized polyethylene terephthalate (metPET), metalized BOPP, and aluminum foil. Exemplary of non-polar substrates useful for contacting the film/adhesive combination above can be polypropylene (PP), polyethylene (PE), and BOPP, and cast polypropylene (cPP) films.

The process for producing the laminate described above can include the steps of:
 (I) providing (a) at least one functionalized film layer comprising a polar-reactive group polyolefin layer used as an internal layer in the film structure;
 (II) providing (b) a lamination adhesive composition having a green tack value of >0.772 N/cm (200 g-f/in);
 (III) providing at least one polar or non-polar substrate;
 (IV) applying the lamination adhesive composition to a least a portion of a surface of the internal layer to form a combination of an internal layer and lamination adhesive composition film structure; and
 (V) contacting at least one polar or non-polar substrate with the adhesive composition present on the internal layer; wherein at least a portion of a surface of the substrate is in contact with the adhesive composition to effectuate a strong bond between the substrate adhered to the internal layer to form a laminate.

The process of making the laminate can include any of the laminate making equipment and process known to those skilled in the art such as dry lamination where the bonding agent is dissolved in a solvent; then the bonding agent-containing solvent is applied to one of the webs to be laminated; and then the solvent is evaporated from the web having the bonding agent-containing solvent applied on the web's surface. The evaporation can take place in a drying oven to provide a first dried web. The first dried web is then laminated to another second web under strong pressure applied by heated rollers to provide a permanent bond between the two webs.

The laminate produced in accordance with the present invention advantageously has several advantageous properties and benefits. In one embodiment, for example, the laminate can be used immediately to make an article, such as a packaging article, without having to wait for a long curing time of the adhesive because of the high green tack exhibited by the adhesive-to-film combination.

In another embodiment, the present invention is directed to a packaging article made using the laminate described above which has been manufactured using an adhesive having a strong bond and a green tack value of >0.772 N/cm (200 g-f/in). Exemplary of packaging articles may include pillow pouches, stand-up pouches, bags, sachets, other laminate webs, and the like.

The process of making the packaging article can include any of the packaging making equipment and processes known to those skilled in the art such as Vertical Form/Fill/Seal (VFSS), Horizontal Form/Fill/Seal (HFFS), premade Stand-up Pouches (SUP), and Form/Fill/Seal Stand-up Pouches (FFS SUP) machines.

The film structure and laminate made in accordance with the present invention can be useful in a variety of applications including, for example, food or non-food laminated packages produced with 2, 3 or more layers such as polyester/foil/PE; paper/poly/foil; BOPP/foil/PE; or BOPP/metalized PP/PE, BOPP, or cPP; or laminations performed by using a Triplex or Tandem laminator process that can laminate 3 substrates like PET/foil/PE, BOPP/foil/PE, PET/BOPP/PE or similar substrates in-line.

EXAMPLES

The following examples are presented to further illustrate the present invention in detail but are not to be construed as limiting the scope of the claims. Unless otherwise stated all parts and percentages are by weight.

Various raw materials used in the Examples are described in Table I as follows:

TABLE I

| Raw Materials | | |
| --- | --- | --- |
| Component | Brief Description | Supplier |
| Elite 5400G | Metalocene LLDPE copolymer | The Dow Chemical Company (Dow) |

TABLE I-continued

Raw Materials

| Component | Brief Description | Supplier |
|---|---|---|
| Amplify EA 101-g-MAH | Ethylene ethyl acrylate copolymer grafted with maleic anhydride | Method A* |
| EVA ELVAX | Ethylene vinyl acetate | Dow-DuPont |
| Amplify TY 1057 | MAH grafted polyethylene | Dow |
| ADCOTE 805A/C | same as ADCOTE L76-205/87-124 described below | Dow |
| ADCOTE 331 | Mono-component general purpose lamination adhesive | Dow |
| ADCOTE L-76-205/ CR87-124 | High solids solvent borne laminating adhesive also known as ADCOTE ™ 805A/C | Dow |
| Standard High Slip PE | | |

Notes for Table I:
*"Method A" is a method used to make Amplify EA 101-g-MAH and is described herein below. "EA" stands for "ethyl acrylate"; "MAH" stands for "maleic anhydride"; "g-MAH" stands for "grafted with maleic anhydride"; "EVA" stands for "ethylene vinyl acetate"; LLDPE" stands for "linear low density polyethylene"; and PE 20 stands for "polyethylene".

Examples 1-4 and Comparative Example A

In the Inventive Examples (Inv. Ex.) and the Comparative Examples (Comp. Ex.) which follow, a solvent-based adhesive was used to laminate (and bond) a PET layer to several functionalized substrates including substrates based on: (1) ethylene ethyl acetate (EEA), (2) ethylene vinyl acetate (EVA) and (3) maleic anhydride (MAH) groups. The effect of the substrates on the adhesive's green tack (bond strength after 10 min of lamination) was evaluated.

Five different films, having the resin formulations described in Table II, were extruded using a five-layer coextrusion line. The films were laminated to a polyethylene terephthalate (PET) substrate (12 microns thick) using a laboratory laminating machine (Labo Combi machine) and one of the side surfaces of the films were corona treated prior to applying 3 g of adhesive to the corona treated surface of the film. Then, 3 g of a high solids, high performance bi-component adhesive, ADCOTE™ L76-205/87-124, was applied to the corona treated surface of the film. The high solids adhesive was used in the Examples to understand the effect of the functionalized films on the adhesive performance related to green tack. The mix ratio and chemical composition of the adhesive, ADCOTE™ L76-205/87-124, used in the Examples are described in Table III.

TABLE II

Formulations of Lamination Resins

| Example | Formulation |
|---|---|
| Comp. Ex. A | 100% Elite 5400 (reference resin) |
| Inv. Ex. 1 | 100% AMPLIFY ™ EA 101-g-MAH |
| Inv. Ex. 2 | 35% EVA ELVAX + 65% AMPLIFY ™ TY 1057 |
| Inv. Ex. 3 | 35% AMPLIFY ™ EA 101-g-MAH % + 65% AMPLIFY ™ TY 1057 |
| Inv. Ex. 4 | 35% Elite 5400 + 65% AMPLIFY ™ TY 1057 |

TABLE III

Solvent-Based, High Solids, High Performance Bi-Component Adhesive

| Adhesive | Isocyanate Component NCO | Polyol Component OH |
|---|---|---|
| Adcote L 76-205/Adcote 87-124 | Adcote L 76-205 | Adcote 87-124 |
| Mix ratio, ppr* | 100 | 17 |

*ppr = parts per one hundred parts of resin

Method A—Method of Making AMPLIFY™ EA 101-g-MAH

Amplify EA is an ethylene ethyl acrylate (EEA) copolymer. This copolymer can be grafted with about 1% maleic anhydride (MAH) groups to enhance the copolymer's functionality. Copolymers such as EEA, EVA or EMA copolymers have polarity and tend to form polar-polar (non-reactive) interactions with the adhesive layer. However, the MAH-g-group portion of a MAH grafted copolymer will tend to form a covalent bond with any excess polyol in the adhesive.

The product description of AMPLIFY™ EA 101-g-MAH is described in Table IV; and the process of preparing AMPLIFY™ EA 101-g-MAH can be carried out by grafting a polymer with maleic anhydride (MAH) groups using a reactive extrusion process. A 92 mm co-rotating twin screw extruder, with medium intensity screws, is used for the reactive extrusion. The formulation consists of a base polymer (e.g., AMPLIFY™ EA 101, maleic anhydride (MAH), 99%) and 2,5-dimethyl-2,5-di(t-butylperoxy) hexane (DBPH, peroxide (POX)). The POX is diluted with mineral oil (e.g., at a 1:1 ratio) to enhance ease of handling and feeding the feed material. The MAH feed level is between 1.4 wt % to 1.5 wt % and the peroxide feed level is at 330 ppm to 650 ppm. The extruder is operated at a rate of 862 kg/hr to 953 kg/hr with a screw speed of between 475 rpm to 630 rpm. The temperature profile (in ° C.) of the extruder for grafting is shown in Table V.

TABLE IV

Product Description

| Product | Brief Description of Product | Density (g/cm$^3$) | Melt Index (° C./min[2]) | Maleic Anhydride (wt %[3]) | Acrylate (wt %) |
|---|---|---|---|---|---|
| AMPLIFY ™ EA 101 | Ethylene ethyl acrylate copolymer | 0.931 | 6 | 0 | 18.5 |
| AMPLIFY ™ EA 101-g-MAH[1] | Maleic anhydride concentrate | 0.931 | 3.23 | >0.5 wt % and <2.5 wt. % | 18.5 |

Notes for Table III:
[1] Maleic anhydride grafted AMPLIFY ™ EA 101.
[2] At 2.16 kg and 190° C.
[3] Based on total product weight.

TABLE V

| | | | | | Temperature Profile of Extruder | | | | | | | |
|---|---|---|---|---|---|---|---|---|---|---|---|---|
| ZONE 2 | ZONE 3 | ZONE 4 | ZONE 5 | ZONE 6 | ZONE 7 | ZONE 8 | ZONE 9 | ZONE 10 | ZONE 11 | S/C[(1)] | PDV[(2)] | DIE |
| 177 | 191 | 191 | 191 | 191 | 191 | 177 | 121 | 121 | 121 | 177 | 177 | 177 |

Notes for Table IV:
[(1)]"S/C" stands for screen changer; and
[(2)]"PDV" stands for polymer divert valve.

Green Tack Bond Strength—Method of Measurement

The green tack bond property of an adhesive can be measured by using an Instron Tensile machine, according to procedure described in ASTM F904-98. In accordance with the procedure, two sides of a laminated structure are held by the machine jaws and then the laminated structure is stretched in a uniaxial direction. Data is obtained by taking two-sample measurements of each sample; and the data is then analyzed using a computer that reports averages and graphics. The green tack property is measured 10 minutes after the laminated structure has gone through the lamination.

Figure 2:
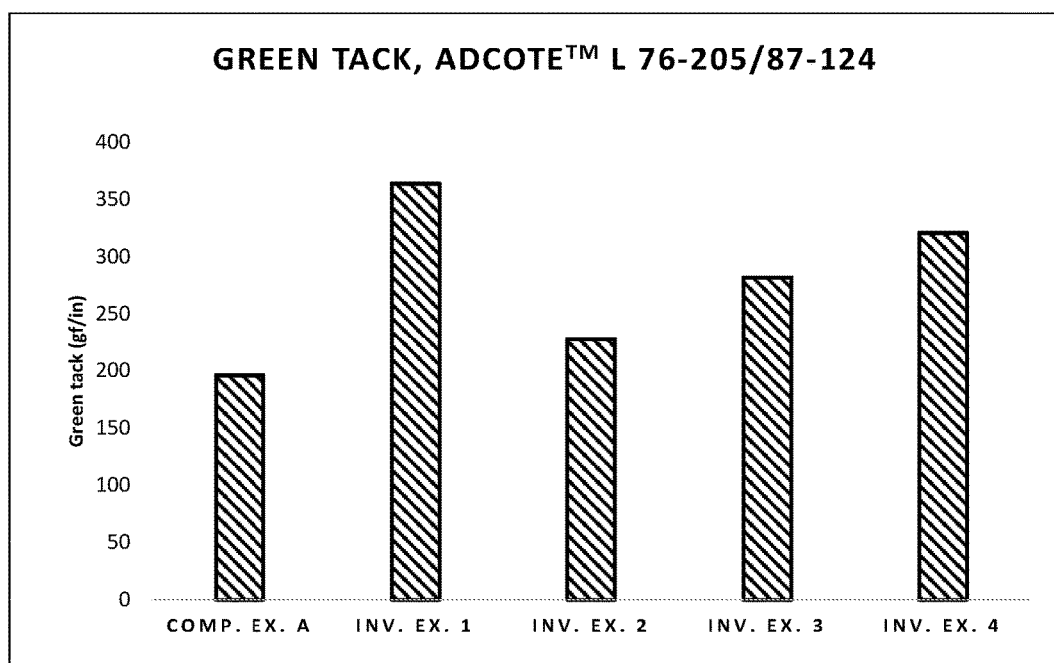
FIG. 2 is a graphical bar chart showing the green tack values of a high performance lamination adhesive, ADCOTE™ L 76-205/87-124, with various different polyethylene formulations.

In the graph of FIG. 2, there is shown green tack values when a high solids adhesive, ADCOTE™ L 76-205/87-124, was used with different PE formulations. When all functionalized film layer substrates (Inv. Ex. 1, Inv. Ex. 2, Inv. Ex. 3, and Inv. Ex. 4) were compared to Comp. Ex. A (Resin reference: 100% ELITE™ 5400 with no additives and a thickness of 50 microns), a very significant increase in green bond values of from 16% to 86% was found. The film layer substrate of Inv. Ex. 1 produced with the adhesive, 100% AMPLIFY EA 101 grafted with 1% g-MAH, had the highest green tack value of 364 gf/inch when measured just 10 minutes after lamination. The high solids high performance bi-component adhesive showed a green tack value of 86%. This unexpected behavior of the laminate of Inv. Ex. 1 will enable one skilled in the art to use (1) tandem (Triplex) lamination or (2) on-line lamination and cutting which was not possible heretofore. The sample of Inv. Ex. 4 also showed an increase in the green bond values of 44%. In summary, as shown in FIG. 2, the results of the above green tack tests demonstrate that co-polymer Amplify EA (1% of MAH) and a blend of "Copolymer EA+Amplify 1057" (1% of MAH in the blend) gives a better green bond to laminates when compared to Comp. Ex. A.

What is claimed is:

1. A film structure comprising:
    (a) at least one functionalized film layer, wherein the at least one functionalized film layer comprises a polar-reactive group polyolefin layer used as an internal lamination layer in the film structure;
        wherein the polar-reactive group polyolefin layer is selected from the group consisting of a maleic anhydride grafted ethylene ethyl acrylate polar copolymer; a physical blend of a non-polar polyethylene and a maleic anhydride grafted ethylene ethyl acrylate polar copolymer; a physical blend of an ethylene vinyl acetate polar copolymer and a maleic anhydride grafted ethylene polar copolymer; and a physical blend of a maleic anhydride grafted ethylene ethyl acrylate polar copolymer and a maleic anhydride grafted ethylene polar copolymer; and
    (b) a lamination adhesive composition present on, and in contact with, a least a portion of a surface of the internal lamination layer; wherein the green tack value of the adhesive composition is greater than 0.772 Newtons/centimeter.

2. The film structure of claim 1, wherein the at least one functionalized film layer is a monolayer.

3. The film structure of claim 1, wherein the at least one functionalized film layer comprises a multilayer of two or more layers, wherein at least one of the two or more layers is an internal layer of a polar-reactive group polyolefin layer, and at least one of the two or more layers is an external layer.

4. The film structure of claim 1, wherein the lamination adhesive composition is a bi-component lamination adhesive composition having predominantly isocyanate groups.

5. The film structure of claim 1, wherein the polar-reactive group polyolefin layer consists of 100 wt % of the maleic anhydride grafted ethylene ethyl acrylate polar copolymer based on the total weight of the polar-reactive group polyolefin layer.

6. The film structure of claim 1, wherein the polar-reactive group polyolefin layer consists of 100 wt % of the physical blend of the non-polar polyethylene and the maleic anhydride grafted ethylene ethyl acrylate polar copolymer.

7. The film structure of claim 1, wherein the polar-reactive group polyolefin layer consists of 100 wt % of the physical blend of the ethylene vinyl acetate polar copolymer and the maleic anhydride grafted ethylene polar copolymer.

8. The film structure of claim 1, wherein the polar-reactive group polyolefin layer consists of 100 wt % of the physical blend of the maleic anhydride grafted ethylene ethyl acrylate polar copolymer and the maleic anhydride grafted ethylene polar copolymer.

* * * * *